(12) United States Patent
Hamilton (10) Patent No.: US 6,929,000 B2
(45) Date of Patent: Aug. 16, 2005

(54) APPARATUS AND METHODS FOR ALIGNING A CENTER OF MASS WITH A ROTATIONAL AXIS OF A SHAFT OR SPINDLE

(75) Inventor: Ernest J. Hamilton, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 190 days.

(21) Appl. No.: 10/191,711

(22) Filed: Jul. 8, 2002

(65) Prior Publication Data

US 2004/0003807 A1 Jan. 8, 2004

(51) Int. Cl.[7] .................................................. B28D 1/04
(52) U.S. Cl. ........................ 125/13.01; 125/12; 83/665
(58) Field of Search ........................ 83/665, 666, 698.4; 125/13.01, 12, 13.02; 451/358, 541

(56) References Cited

U.S. PATENT DOCUMENTS

| 2,167,744 | A | * | 8/1939 | Cosby et al. .................. 83/666 |
| 3,691,707 | A | | 9/1972 | Von Arx et al. |
| 3,805,661 | A | * | 4/1974 | Tuomaala ...................... 83/666 |
| 4,014,311 | A | * | 3/1977 | Steere, Jr. ................. 125/13.02 |
| 4,135,499 | A | * | 1/1979 | Schumacher ............. 125/13.02 |
| 4,143,572 | A | * | 3/1979 | Schonmeier .................. 83/501 |
| 4,219,004 | A | | 8/1980 | Runyon |
| 4,370,853 | A | | 2/1983 | Bauer et al. |
| 5,020,280 | A | * | 6/1991 | O'Reilly ...................... 451/342 |
| 5,259,149 | A | | 11/1993 | Klievoneit et al. |
| 5,261,385 | A | | 11/1993 | Kroll |
| 5,463,861 | A | | 11/1995 | Lorenz |
| 5,477,845 | A | * | 12/1995 | Zuzelo ......................... 125/15 |
| 5,934,973 | A | | 8/1999 | Boucher et al. |
| 6,095,910 | A | | 8/2000 | Luedeke |
| 2003/0140751 | A1 | * | 7/2003 | McGehee et al. ............. 83/169 |

* cited by examiner

Primary Examiner—Lee D. Wilson
(74) Attorney, Agent, or Firm—TraskBritt (57) ABSTRACT

Centering elements for effectively reducing the clearance between a shaft and a rotatable element, such as a blade-fixing flange of a dicing saw for semiconductor substrates or carrier substrates, installable thereon are disclosed. In addition, the centering elements may be used to substantially align a center of mass of a rotatable element installed onto the shaft with the axis of rotation of the shaft. The centering element may position the center of mass of a rotatable element at a position that is in substantial alignment with the axis of rotation. Methods for assembling rotatable elements onto shafts and methods for balancing such rotatable elements are also disclosed. Multiple fixtures as well as multiple centering elements may be employed. In addition, one centering element may position more than one fixture.

46 Claims, 3 Drawing Sheets

APPARATUS AND METHODS FOR ALIGNING A CENTER OF MASS WITH A ROTATIONAL AXIS OF A SHAFT OR SPINDLE

BACKGROUND OF THE INVENTION

1. Field of the Invention

The present invention relates to compressible elements for use with rotatable elements, such as dicing saw elements, installable onto a shaft or spindle or for use with shafts or spindles upon which rotatable elements are to be installed. More specifically, the compressible elements of the present invention are useful for centering rotatable members around the rotational axis of shafts or spindles, for reducing clearances between the inner diameters or surfaces of rotatable members and the outer diameters or surfaces of shafts or spindles, as well as for dampening vibrations during rotation of such a shaft or spindle and, thus, each of the rotatable elements thereon. In addition, the present invention includes methods for installing one or more rotatable elements upon a shaft or spindle, as well as to methods for designing rotatable elements to be installed upon shafts or spindles and shafts or spindles upon which rotatable elements are to be installed.

2. State of the Art

Many devices utilize high-speed spinning elements. For instance, dicing saws for cutting circuit boards or other carrier substrates, semiconductor substrates (e.g., silicon wafers), and the like employ rotating members that may be spun at rotational speeds of up to 60,000 revolutions per minute ("rpm").

In order to singulate or perform "dicing" operations on a carrier substrate, such as a ball grid array ("BGA") assembly substrate, or another semiconductor device substrate, such as a full or partial wafer of silicon or another substrate from which a semiconductor device may be singulated, dicing saws are typically used. Apparatus for dicing BGA substrates usually comprise at least one saw blade attached to a spindle, which is rotated via a motor attached thereto. Conventionally, a single saw blade was attached to a shaft or spindle and, during rotation thereof, moved repeatedly in a linear motion to cut the carrier substrate at desired locations (e.g., between adjacent BGA substrates). The use of a single saw blade to cut a substrate at a number of different, parallel locations is, however, a somewhat time-consuming process. Increasingly rapid dicing methods include use of multiple or "ganged" saw blade assemblies, which are configured to simultaneously cut a substrate at different parallel locations. In addition, due to ever-increasing densities of semiconductor devices or circuit boards on a substrate, the individual saw blades are relatively thin to accommodate narrow spacing between adjacent semiconductor devices or circuit boards. Further, in order to exact precision cuts with reduced forces on the BGA substrate during cutting, dicing blades are rotated at relatively high speeds, typically about 15,000 rpm to about 25,000 rpm and up to 60,000 rpm.

Because of such high rotational speeds, mounting and balance of a dicing saw assembly are also of concern, as mounting and balance directly affect deflection, vibration, and run-out (i.e., movement of the cutting edge out of the desired plane) during use of a dicing saw assembly for cutting. To obtain trueness and stability during cutting and to minimize run-out, the blades are typically mounted between adjacent support flanges so that only a small cutting edge of each blade is exposed. In addition, spacers may be used in a ganged assembly to provide desired spacing between the adjacent blades. Each element of the assembly must be balanced to reduce vibration during operation.

Machinery with rotatable components, such as dicing saws, are often designed with a drive shaft. Generally, a drive shaft is attached to a motor directly and provides rotational force to an assembly. Rotatable elements and other elements are generally installed onto the shaft or spindle by way of a hole formed through such elements to facilitate sliding these elements onto the shaft. Thus, the outer surface of the shaft is surrounded by the inner surface of the hole formed through the element. An engagement structure must also be provided so that torque is transmitted from the shaft or spindle to the element, causing the element to spin as the shaft or spindle is rotated. Some common engagement structures include splines, keyways, and pins. Some assemblies may alternatively be compressed onto a tapered surface or expanding fixture, as known in the art. As another alternative, engagement between an element and a shaft or spindle may be accomplished via threaded connections.

Undesired imbalance forces may develop in high-speed spinning assemblies due to radial imbalance in the mass of the spinning elements relative to the axis of rotation. Such imbalance force is determined by the eccentricity (i.e., the radial distance away from the axis of rotation) of the center of mass or gravity, as well as the magnitude of the mass of the rotating element and the square of the rotational speed of the shaft or spindle. Stated another way, imbalance force is proportional to the distance that the center of mass of the member is displaced from the rotational axis, the magnitude of the mass of the member, and the square of the rotational speed of the shaft or spindle. Therefore, relatively small center of mass eccentricities relative to the axis of rotation and masses can be greatly magnified when a shaft or spindle is rotated at high speed.

Imbalanced rotating elements may cause significant problems. Vibration of rotating elements may be destructive to rotating machinery, and imbalances may cause stresses that are typically induced upon rotating machinery to be magnified. For example, increased reciprocating stresses reduce the fatigue life of rotating machinery, causing premature failure.

Figure 1A:
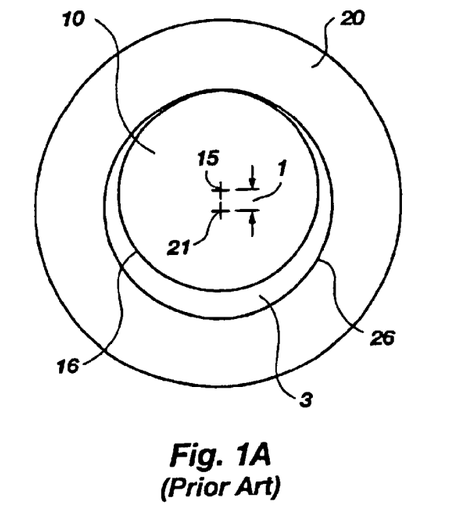
FIG. 1A illustrates a cross-sectional view of a prior art shaft and rotatable element assembly, taken transverse to the axis of rotation thereof.
Figure 1B:
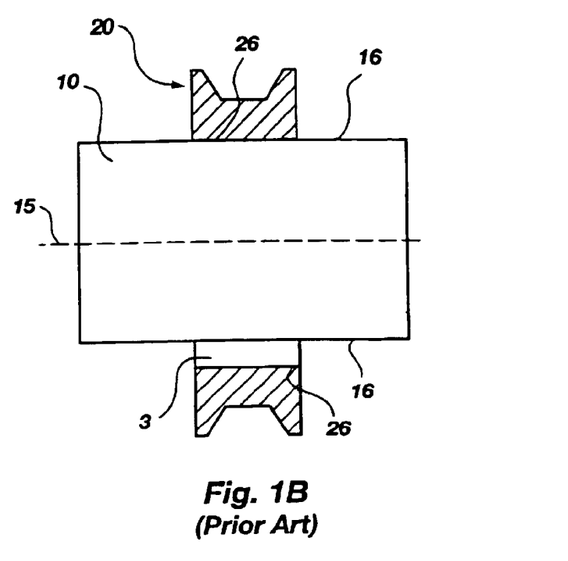
FIG. 1B illustrates a cross-sectional view of the shaft and rotatable element assembly shown in FIG. 1A, taken through the axis of rotation of the shaft.

Referring to FIGS. 1A and 1B, a rotatable element 20 is installed on a shaft 10. A clearance 3 exists between an outer surface 16 of the shaft 10 and an inner surface 26 of the rotatable element 20. Clearance 3 is exaggerated to illustrate the prior art. Importantly, the center of mass 21 of the rotatable element 20 does not coincide with, and may not even be near, the rotational axis 15 of the shaft 10 and, thus, of the assembly. In addition, the center of mass 21, assuming homogeneous material properties, will occur at an appropriate thickness with respect to the geometry of the longitudinal axis shown in FIG. 1B. Therefore, when the rotatable element 20 is rotated about the rotational axis 15 of the shaft 10, the center of mass 21 is offset from the rotational axis 15 by an offset distance 1. Offset distance 1 is equal to about twice the average clearance 3 between inner surface 26 of the rotatable element 20 and the outer surface 16 of the shaft 10.

The rotatable element 20 does not rotate relative to the shaft 10. Although clearance 3 may be sufficient to allow for such rotation between the rotatable element 20 and the shaft 10, the rotatable element 20 is fixed to the shaft 10 to accept torque therefrom. Typically, such fixturing is accomplished by way of a longitudinal compression element, such as a screw, bolt, or pin that extends through the inner surface 26 of the rotatable element 20 and that may be rigidly biased against the outer surface 16 of the shaft 10. Therefore, once each rotatable element 20 is secured to the shaft 10, its position along the shaft 10 and relative to other elements along the shaft 10 may be maintained.

In order to reduce the detrimental effects of imbalanced rotating machinery, spinning assemblies require frequent balancing of one or more of the rotatable elements thereon. The amount and location of imbalance of a rotating assembly may be measured, facilitating the calculation of a correction. Balance corrections may be accomplished by moving the center of mass of one or more rotatable elements to or toward the axis of rotation. Alternatively, a balance correction may be effected by adding weight at a radial distance away from the rotational axis at substantially 180° phase shift with respect to the angular position of the imbalance. As another alternative, a correction for imbalance may be accomplished by removing material at a radial distance from the rotational axis of the member at substantially the angular position of the imbalance. Obviously, position of the correction as well as magnitude of the correction weight must be taken into account to properly balance a rotating body. Further, several balancing correction operations may be required to accurately balance a rotatable element.

As imbalance variables become increasingly small and, therefore, difficult to measure and correct, assembly and reassembly of a rotatable assembly may change the balancing characteristics thereof. Thus, minor dimensional changes and clearances may cause detrimental imbalance.

Assuming that the rotatable elements are substantially balanced prior to or upon installation thereof onto a shaft, imbalance of an assembly may be caused by the clearance between the inner surface of each rotatable element and the outer surface of the shaft or spindle that is required to install the rotatable element onto the shaft or spindle. More specifically, as the rotatable elements are installed onto a shaft or spindle, the inner surface of the rotatable member does not fully engage the outer surface of the shaft or spindle. Thus, if the shaft or spindle has a circular cross section taken transverse to the axis of rotation thereof, the center of mass of the rotatable element may be offset by twice the average clearance between the inner surface of the shaft or spindle and the outer surface of the rotatable element. Alternatively, if the shaft or spindle has a noncircular cross section, the distance that the rotatable element may shift relative to the axis of rotation of the shaft or spindle may be larger than twice the average radial clearance between the inner surface of the rotatable element and the outer surface of the shaft or spindle.

The "sloppiness" that may be caused when there is too much clearance between the inner surface of a rotatable element and the outer surface of a shaft or spindle upon which the rotatable element is installed has typically been addressed by reducing the clearance between the rotatable element and the shaft or spindle. In so doing, both the shaft and rotating member must be machined more accurately to smaller tolerances, causing an increase in the cost of each. Furthermore, some clearance is required if simple assembly and disassembly are desired.

U.S. Pat. No. 5,261,385 to Kroll (hereinafter "Kroll") teaches an exemplary abrasive cutting blade assembly with multiple, ganged blades. A hub or ring is positioned onto a shaft or spindle in order to facilitate positioning and affixation of abrasive saw blades relative to the shaft or spindle. Notably, Kroll does not disclose correcting for the clearance between the shaft and hub to reduce rotational imbalance in the assembly. Further, Kroll does not disclose positioning the center of mass of the hub so that it is aligned with the rotational axis of the assembly by way of a biasing element.

In order to dampen vibrations that may occur in rotating machinery as a result of the clearance between one or more rotatable elements and a shaft or spindle upon which it is installed, biasing elements, such as screws, bolts, pins or the like, may be used to more rigidly secure the rotatable element to the shaft or spindle. For instance, U.S. Pat. No. 5,463,861 to Lorenz (hereinafter "Lorenz") discloses an apparatus relating to a friction false twist unit for crimping synthetic fibers. Damping elements are positioned about shaft bearings to dampen the vibrations generated by the rotating shaft during acceleration. In addition, a friction dampener is provided that allows radial play during high vibration and rigidly fixes the shaft during low vibration. However, Lorenz does not teach that the damping elements or the friction dampener are useful for positioning a center of mass of a rotatable element relative to an axis of rotation of a shaft or spindle onto which the rotatable element is installed.

Thus, it can be understood that reducing rotational imbalance by aligning the center of mass of high-speed rotating members to the rotational axis of the assembly is of great importance in balancing rotating assemblies and thus to the longevity and performance of rotating machinery. Nonetheless, the current state of the art lacks an element that reduces clearance between a rotatable element and a shaft or spindle upon which the rotatable element is to be positioned.

BRIEF SUMMARY OF THE INVENTION

The present invention relates to an apparatus for accurately positioning rotatable elements on a shaft or spindle to substantially align the center of mass of a rotatable element to the rotational axis of the shaft or spindle and, thus, to the rotational axis of the assembly. By positioning each rotatable element of an assembly in such a way as to align its center of mass with the rotational axis of the shaft or spindle of the assembly, imbalance of the assembly is reduced or eliminated.

In the case of an assembly including a shaft or spindle with a substantially circular cross section taken transverse to the axis of rotation thereof and one rotatable element installed thereon, the imbalance forces may be related to the clearance between the outer surface of the shaft or spindle and the corresponding inner surface of the rotatable element. Put another way, if the center of mass of the member is aligned with the rotational axis of the shaft, imbalance would be minimized or eliminated.

In the case of multiple rotatable elements installed onto a shaft or spindle, the imbalance may be additive. For instance, assuming that each rotatable element has clearance with respect to the shaft or spindle, then each rotatable element potentially contributes to the imbalance of the assembly. In the case of a somewhat horizontally oriented shaft or spindle, the center of mass of each rotatable element would be biased in the direction of gravity, potentially causing the inner surface of each rotatable element to rest upon and, thus, contact the outer surface of the shaft or spindle at its uppermost point. In this case, the imbalance of each rotatable element accumulates, causing the assembly to be imbalanced.

The present invention includes centering elements that facilitate alignment of the center of mass of a rotatable element assembled with a shaft or spindle relative to the rotational axis of the shaft or spindle and, thus, of the rotational axis of the assembly. The centering elements reduce the amount of tolerance or space between an inner surface of a rotatable element and an adjacent, outer surface of a spindle or shaft upon which the rotatable element is positioned. In doing so, the center of mass of the member may coincide more closely with or be located at the rotational axis of the shaft. Thus, imbalance of the assembly is reduced.

In one embodiment, the centering element comprises at least one biasing element, which is disposed between at least one rotatable element and the shaft or spindle. The biasing element may be a resilient member that is insertable between the rotatable element and the shaft or spindle to position the center of mass of the rotatable element at or near the axis of rotation of the shaft or spindle in order to reduce the rotational imbalance of the assembly.

In another embodiment, at least two biasing elements are disposed between a rotatable element and the shaft or spindle. Multiple, axially spaced biasing elements may be used to constrain the member from tilting along the longitudinal axis, or to allow for straightforward assembly and disassembly.

In another embodiment, one or more pairs of biasing elements are positioned at opposite axial sides of each rotatable element to position the center of mass associated with the rotatable element. By way of example only, each rotatable element may be configured with inwardly tapered or chamfered inner surfaces at the axial sides thereof to matingly engage at least one complementary biasing element. Such a biasing element may be positioned between adjacent rotatable elements on a shaft or spindle to at least partially position the centers of mass of the adjacent rotatable elements relative to the axis of rotation of the shaft or spindle.

Also, multiple, radially positioned biasing elements may be used to position the center of mass of each rotatable element relative to an axis of rotation of a shaft or spindle to which the rotatable element is secured. Integral biasing/measurement devices may be employed in order to closely align the center of mass of the member to the rotational axis of the assembly.

As an alternative to the use of one or more resilient biasing elements as a centering element, the centering element may include one or more rigid elements or combinations of rigid and compliant elements, possibly including resilient biasing elements, that facilitate centering and/or alignment of rotatable elements relative to rotating drive elements. Rigid centering elements may be arranged similarly to biasing elements.

Accordingly, the present invention enables alignment of the center of mass of a member assembled with a shaft with the rotational axis of the assembly, thereby reducing the rotational imbalance of the assembly. More specifically, the center of mass of the member is positioned from the axis of rotation at a distance less than twice the average clearance between the outer surface of the shaft and the inner surface of the member and, more preferably, at a distance less than the clearance from the axis of rotation.

Other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

In the drawings, which illustrate exemplary embodiments for carrying out various aspects of the present invention.

DETAILED DESCRIPTION OF THE INVENTION

The present invention provides apparatus and methods to facilitate balancing of rotating assemblies. The apparatus and methods of the present invention may be used to address rotational balancing concerns present in semiconductor process, assembly, and packaging equipment, such as saws for use in severing substrates from one another or for dicing semiconductor substrates (e.g., full or partial wafers) carrying multiple semiconductor devices. Particularly, the present invention contemplates apparatus and methods for reducing the clearances between and, thus, for mating shafts and rotatable elements to be installed thereon so that the center of mass of each rotatable element is aligned with the rotational axis of the shaft and, thus, of the assembly by way of a biasing element.

As used herein, the term "rotatable element" is meant to contemplate an article installed onto a shaft or spindle. A general ring-shaped rotatable element 20 is depicted but in no way limits the geometry or function of the teachings of the present invention. Exemplary rotatable elements include blade-fixing flanges, spacers, retaining elements, blades or other cutting elements, or other rotatable elements assembled to a shaft or spindle. Furthermore, multiple or "ganged" assemblies of dicing saw blades or other cutting elements, as well as associated fixing flanges or other fixing elements and spacers are contemplated by the present invention.

The prior art approach to reduce the imbalance of the assembly is to machine the rotatable element 20 and the shaft 10 precisely, thus reducing the clearance 3 therebetween and, thereby, reducing the rotational imbalance of the assembly. However, in order to assemble a rotatable element 20 onto the shaft 10, some clearance is required. Nonetheless, rotational imbalance may occur as a result and is only reduced by the reduction in clearance 3 between the shaft 10 and the rotatable element 20. In addition, machining costs increase as tolerances become more accurate.

Moreover, when the center of mass of the rotatable element 20 does not coincide with the rotational axis 15 of the shaft 10, imbalance occurs. For symmetric rotatable elements 20, the center of mass substantially coincides with the centroid thereof.

Figure 2A:
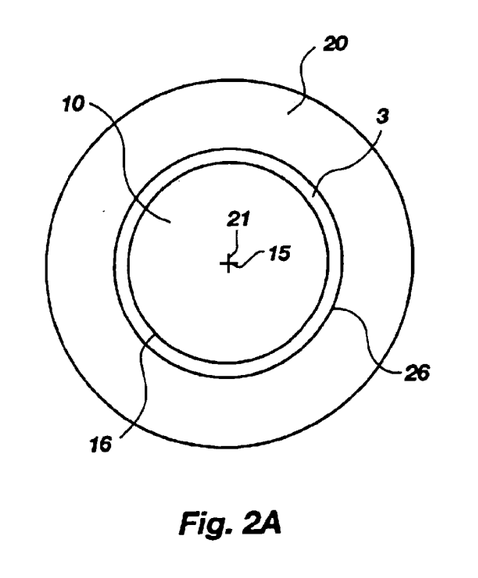
FIG. 2A illustrates a cross-sectional view of a shaft and rotatable element assembly, taken transverse to the axis of rotation of the shaft, and wherein the clearance between the outer surface of the shaft and the inner surface of the rotatable element is equalized.
Figure 2B:
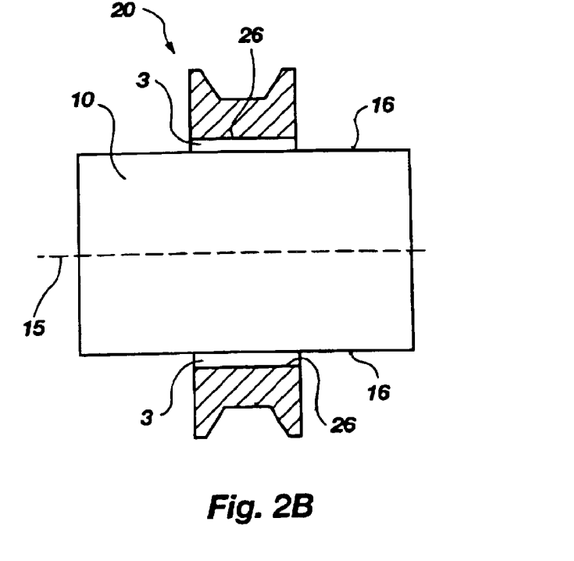
FIG. 2B shows a cross-sectional view of the shaft and rotatable element assembly shown in FIG. 2A, taken through the axis of rotation of the shaft.

FIGS. 2A and 2B show a shaft 10 and rotatable element 20 wherein the rotatable element 20 is substantially centered with respect to the rotational axis 15 of the shaft 10. Accordingly, the center of mass 21 of the rotatable element 20 coincides substantially with the rotational axis 15 of the shaft 10. In addition, the clearance 3 between the outer surface 16 of the shaft 10 and the inner surface 26 of the rotatable element 20 is substantially equalized for the geometries shown. However, equalized clearance 3 between the outer surface 16 of the shaft 10 and the inner surface 26 of the rotatable element 20 is not necessary to practice the present invention. For instance, varying geometries such as tapers or chamfers may cause the clearance 3 to vary. Irrespective of clearance 3, if the rotatable element 20 is biased or positioned so that its center of mass 21 coincides substantially with the rotational axis 15 of the shaft 10 and, thus, of the assembly, then imbalance of the rotatable element 20 may be reduced or substantially eliminated.

Figure 3A:
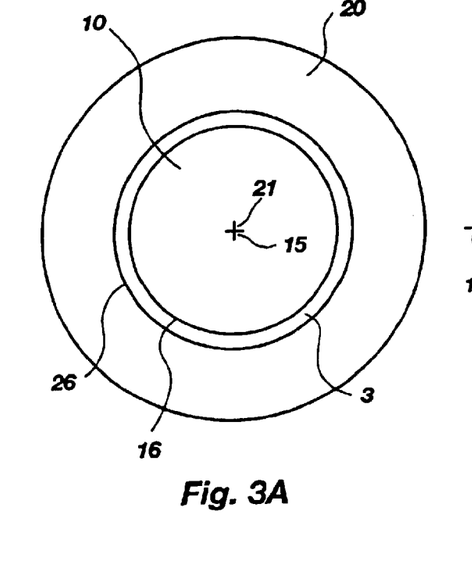
FIG. 3A illustrates a cross-sectional view of a shaft and rotatable element assembly wherein the circumferential clearance between the shaft and rotatable element is equalized.
Figure 3B:
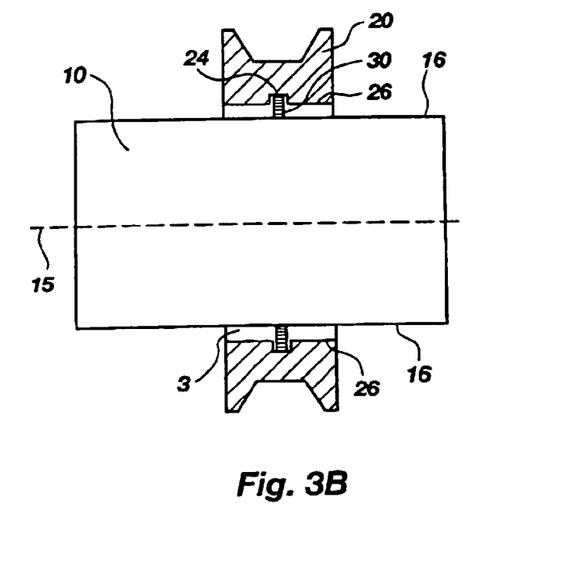
FIG. 3B shows a cross-sectional view of the shaft and rotatable element assembly shown in FIG. 3A taken through the axis of rotation of the shaft.

FIGS. 3A and 3B illustrate an exemplary embodiment of an assembly including a rotatable element 20 and a biasing element 30 which incorporates teachings of the present invention. The depicted rotatable element 20 is configured with a circumferential groove 24 recessed in its inner surface 26. The biasing element 30 is disposed partially within the circumferential groove 24 and preferably positions the center of mass 21 of the rotatable element 20 to coincide with the rotational axis 15 of the shaft 10. Alternatively, a groove or other recess may be configured in the shaft 10, or in both the rotatable element 20 and the shaft 10, to at least partially receive and retain the biasing element 30. One or more retention elements (e.g., bolts, screws, pins, etc.) (not shown), as known in the art, transfer torque from the shaft 10 to the rotatable element 20. The biasing element 30 may also transmit torque from the shaft 10 to the rotatable element 20 during rotation of the shaft 10. Alternatively, the rotatable element 20 may be axially compressed against or between other rotatable elements (not shown) that are more rigidly secured to the shaft 10 and torque may be communicated to the rotatable element 20 by such other rotatable elements.

Since the depicted rotatable element 20 is symmetric about the axis of rotation 15 of the shaft 10, as well as laterally about the axial midpoint of the rotatable element 20, the center of mass 21 thereof will occur substantially at the center of rotatable element 20. Alternative rotatable element geometries, including both symmetric and asymmetric geometries, are also contemplated by the present invention. Significantly, the teachings of the present invention contemplate biasing or positioning a rotatable element 20 in order to substantially align its center of mass 21 with the rotational axis 15 of the shaft 10. More specifically, use of a biasing element 30 to at least partially align the center of mass 21 of the rotatable element 20 with the rotational axis 15 of the shaft 10 reduces the distance from the rotational axis 15 and the center of mass 21 of the rotatable element 20 to less than the clearance 3 that would be present between the inner surface 26 of the rotatable element 20 and the outer surface 16 of the shaft 10 as the rotatable element 20 rests on the shaft 10 with the biasing element 30 therebetween.

The biasing element 30 may be configured to engage the outer surface 16 of the shaft 10 and the inner surface 26 of the rotatable element 20 in order to more closely align the center of mass 21 of the rotatable element 20 with the rotational axis 15 of the shaft 10. The biasing element 30 may be annular in shape and formed from a somewhat compliant material, such as a nibber, a plastic or other elastomers, as well as other somewhat compressible media.

Alternatively, the biasing element 30 may be formed from a metal or an alloy. In an alternative configuration, the biasing element 30 may comprise one or more spring elements (e.g., coil spring, leaf spring, spring-loaded or gas-loaded piston, elastomeric blocks, etc.).

Still referring to FIGS. 3A and 3B, assembly of the rotatable element 20 and shaft 10 may require that the biasing element 30 be somewhat compressed. Compression of the biasing element 30 may occur as the rotatable element 20 is installed upon the shaft 10. Of course, compression of the biasing element 30 depends on its radial dimensions (i.e., relative to the axis of rotation 15), as well as the portion thereof received by a recess in one or both of the rotatable elements 20 and the shaft 10 and the clearance 3 between the rotatable element 20 and the shaft 10 (e.g., the circumferential groove 24). In addition, the axial width of the circumferential groove 24 or other biasing element-retaining recess may also affect (e.g., limit) compression of the biasing element 30 as it deforms under compressive force. Such biasing element-retaining recess geometries may be tailored to facilitate application of the desired amount of force between a rotatable element 20 and a shaft 10 upon which the rotatable element 20 is installed.

Typically, the rotatable element 20 is one of several elements assembled with the shaft 10. As such, the rotatable element 20 may be held in place longitudinally along the shaft 10 by axial compression between adjacent elements. Alternatively, a rotatable element 20 may be installed upon and secured to a shaft 10 by way of a threaded connection on one or both ends of the shaft 10. As another alternative, a retention element may extend through and be secured to a rotatable element 20 and bias against the outer surface 16 of the shaft 10 or engage a correspondingly configured feature of the shaft 10 to secure the rotatable element 20 thereto. While the shaft 10 is depicted as a solid member, the configuration of the shaft 10 may differ considerably. For instance, the shaft 10 may comprise a hollow spindle, collet, chuck, or other rotating machinery apparatus, as known in the art.

Figure 4A:
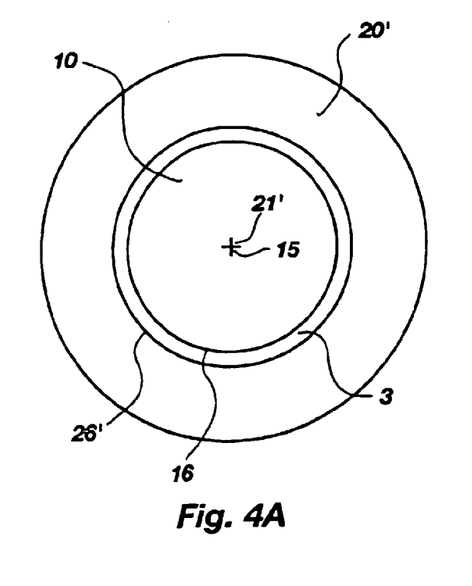
FIG. 4A illustrates a cross-sectional view of a shaft and rotatable element assembly where multiple biasing or positioning elements substantially equalize the circumferential clearance between the shaft and rotatable element taken through the axis of rotation of the shaft.
Figure 4B:
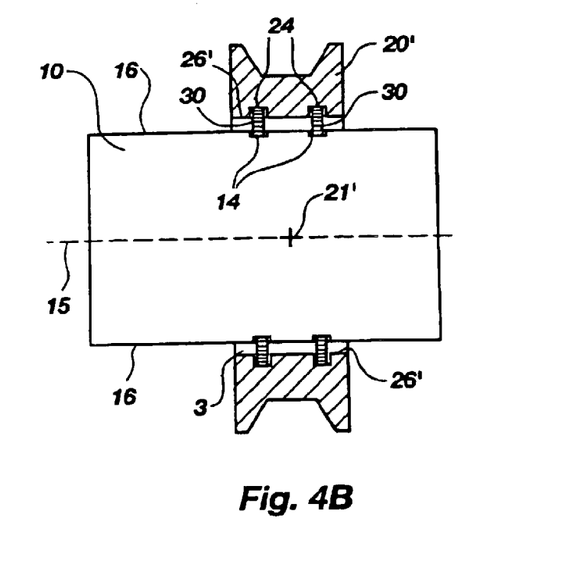
FIG. 4B shows a cross-sectional view of the shaft and rotatable element assembly shown in FIG. 4A taken through the axis of rotation of the shaft.

FIGS. 4A and 4B show a rotatable element 20' configured with multiple annular biasing elements 30 to substantially align the center of mass 21' of the rotatable element 20' with the rotational axis 15 of the shaft 10. The use of multiple biasing elements 30 may prevent the rotatable element 20' from tilting or canting relative to the rotational axis 15 of the shaft 10, thereby constraining the position of the inner surface 26' of the rotatable element 20' relative to the rotational axis 15. However, nonparallelism of the inner surface 26' of the rotatable element 20' will not affect the rotational balance of the rotatable element 20' if the center of mass 21' thereof is aligned with the rotational axis 15 of the shaft 10. Parallelism may, however, be desirable generally, irrespective of rotational balancing concerns.

Conversely, biasing elements 30 may be carried by the shaft 10. For example, biasing "buttons" may be disposed within recesses 14 and provided between the surface 16 of a rotatable shaft 10, thus, in effect, substantially removing the clearance 3 between the rotatable element 20' and the shaft 10 upon positioning the rotatable element 20' on the shaft 10 and thereby at least partially aligning the center of mass 21' of the rotatable element 20' with the rotational axis 15 of the shaft 10. Such biasing elements 30 may protrude from the outer surface 16 of the shaft 10 so as to engage the inner surface 26' of the rotatable element 20' at one or more locations or, as illustrated, to be at least partially received by a recess 24 formed in the inner surface 26' of the rotatable element 20'.

Further, biasing elements 30, 30''' may be configured and tailored to engage or be engaged by certain areas of a rotatable element, and may be shaped in almost any geometry. For instance, a biasing element of the present invention may be placed anywhere in the available inner surface area of a rotatable element, as well as on axial surfaces thereof. Biasing elements may comprise disc springs, washer springs, compression springs, O-rings, x-rings (which are annular in shape and have an x-shaped cross section and are also known as QUAD-RINGS®), solid pliable materials, or other biasing means known in the art. Multiple biasing elements may be used in combination. In addition, measurement elements in combination with or integral to biasing elements may be used. Further, recesses may be configured to accept a portion of at least one biasing element.

Figure 5A:
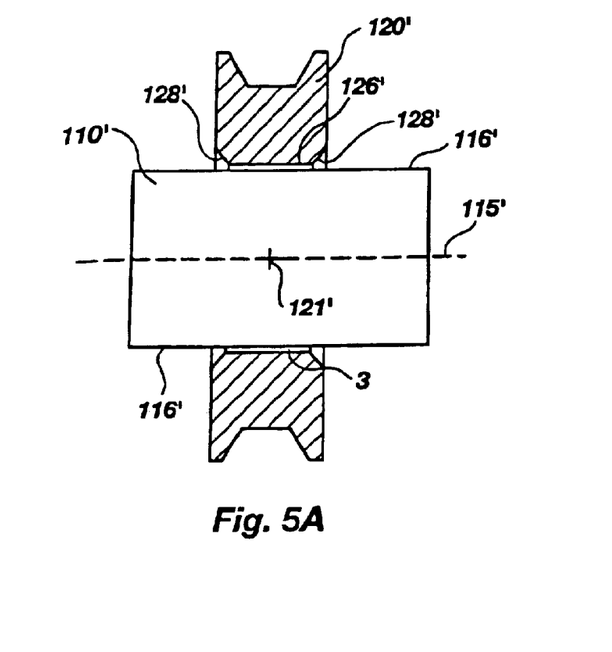
FIG. 5A illustrates a cross-sectional view of a shaft and rotatable element assembly, taken through the axis of rotation of the shaft, wherein a tapered surface on the rotatable element engages a biasing or positioning element configured to equalize the circumferential clearance between the shaft and rotatable element.
Figure 5B:
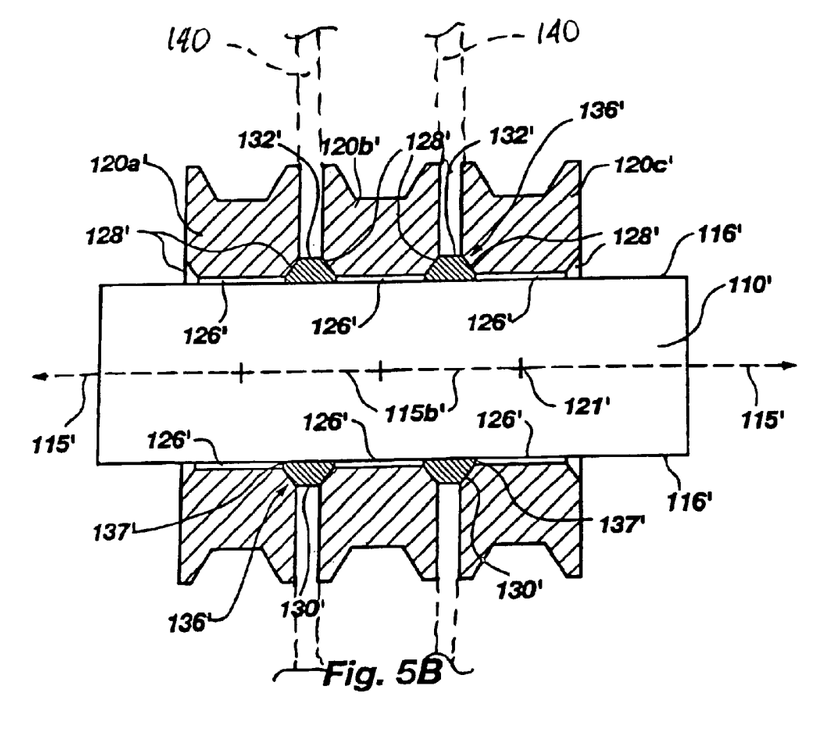
FIG. 5B shows a cross sectional view of a shaft and rotatable element assembly with multiple rotatable elements wherein one biasing element engages multiple rotatable elements taken through the axis of rotation of the shaft.

FIGS. 5A and 5B show a further embodiment of biasing element 130' incorporating teachings of the present invention. The biasing element 130' includes at least one axial surface 136' which tapers toward an axis of rotation 115*b*' thereof from the axial center 132' thereof toward a corresponding axial end 137' of the biasing element 130'. A complementary rotatable element 120' (individually 120*a*', 120*b*', 120*c*') is configured with a taper 128' on inner surface 126' on at least one axial end thereof. The axial taper 128' is used to align the center of mass 121' of the rotatable element 120' with the rotational axis 115' of a shaft 110' on which the rotatable element 120' is installed.

As mentioned hereinbefore, often several rotatable elements are compressed axially when assembled onto the shaft 110'. Threading collets, retention members, or other machine fixtures known in the art for securing the elements of the assembly to one another may be employed. FIG. 5B shows an assembly of rotatable elements 120*a*', 120*b*', 120*c*' installed on a shaft 110'. Biasing elements 130' are disposed axially between adjacent rotatable elements 120*a*', 120*b*', 120*c*'. Each biasing element 130' may engage and align one or more rotatable elements 120*a*', 120*b*', 120*c*' along the taper 128' thereof. The biasing elements 130' may also engage the outer surface 116' of the shaft 110' to align the center of mass 121' of each rotatable element 120*a*', 120*b*', 120*c*' with the rotational axis 115' of the shaft 110'. When rotatable elements 120*a*', 120*b*', 120*c*' comprise blade-securing flanges, saw blades 140 of known type (shown in phantom) may be secured therebetween, as known in the art.

Furthermore, as an additional advantage to the present invention, rotatable elements and/or shafts may be machined with less precise tolerances than those that are typically required for balancing and preserving the balance of state of the art dicing saws at high rotational speeds. As mentioned hereinbefore, machining costs increase with increasingly accurate tolerances. Therefore, by way of the present invention, machining costs of rotatable elements and/or shafts may be reduced, while the rotational imbalance of assemblies including the same may be kept at reduced levels or substantially eliminated.

Although the foregoing description contains many specifics, these should not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A centering element for aligning a center of mass of a rotatable element of a saw with an axis of rotation of a spindle of the saw upon which the rotatable element is configured to be positioned, comprising at least one compressible, resilient member configured to be installed at an inner edge of the rotatable element and oriented so as to be pressed against at least one of the rotatable element and the spindle upon assembly of the rotatable element on the spindle.

2. The centering element of claim 1, wherein the at least one compressible, resilient member comprises an O-ring configured to be positioned adjacent to the inner edge of the rotatable element.

3. The centering element of claim 1, wherein the at least one compressible, resilient member comprises an x-ring configured to be positioned adjacent to the inner edge of the rotatable element.

4. The centering element of claim 1, wherein the at least one compressible, resilient member comprises a plurality of springs positioned relative to the inner edge of the rotatable element so as to contact an outer surface of the spindle at a corresponding plurality of discrete locations upon assembly of the rotatable element on the spindle.

5. The centering element of claim 4, wherein each spring of the plurality of springs comprises a coiled spring.

6. The centering element of claim 1, wherein the at least one compressible, resilient member is configured to be partially received by a recess formed in an outer surface of the spindle upon assembly of the rotatable element on the spindle.

7. The centering element of claim 1, wherein the at least one compressible, resilient member is configured to transmit torque of the spindle during rotation thereof to the rotatable element.

8. The centering element of claim 1, wherein the saw is configured for use in dicing semiconductor substrates or carrier substrates.

9. A saw assembly, comprising:
a spindle rotatable about an axis of rotation thereof;
at least one rotatable element including an aperture therethrough for installation thereof upon the spindle in an assembled relationship, a clearance existing between an inner surface of the aperture and an outer surface of the spindle when the at least one rotatable element and the spindle are in the assembled relationship; and
at least one centering element configured to be positioned between the inner surface and the outer surface when the at least one rotatable element and the spindle are in the assembled relationship, the at least one centering element substantially filling the clearance.

10. The saw assembly of claim 9, wherein the at least one rotatable element comprises one of a flange for retaining a dicing blade and a spacer.

11. The saw assembly of claim 9, wherein the at least one centering element comprises a compressible, resilient member.

12. The saw assembly of claim 11, wherein the compressible, resilient member comprises one of an O-ring and an x-ring.

13. The saw assembly of claim 12, wherein the inner surface of the aperture of the at least one rotatable element includes a groove configured to receive the O-ring.

14. The saw assembly of claim 11, comprising a plurality of centering elements positioned relative to discrete locations of the inner surface.

15. The saw assembly of claim 14, wherein the discrete locations are at different axial positions of the inner surface relative to a rotational axis of the at least one rotatable element.

16. The saw assembly of claim 15, wherein the at least one rotatable element comprises a plurality of recesses, each of which is configured to at least partially receive a corresponding centering element of the plurality of centering elements.

17. The saw assembly of claim 14, wherein the discrete locations are axial aligned relative to a rotational axis of the at least one rotatable element.

18. The saw assembly of claim 17, wherein the at least one rotatable element comprises a plurality of recesses, each of which is configured to at least partially receive a corresponding centering element of the plurality of centering elements.

19. The saw assembly of claim 11, wherein the compressible, resilient member comprises a spring.

20. The saw assembly of claim 19, wherein the spring comprises a coiled spring.

21. The saw assembly of claim 9, wherein the spindle includes at least one recess formed in the outer surface thereof for partially receiving the at least one centering element.

22. The saw assembly of claim 9, wherein the at least one centering element is configured to transmit torque of the spindle during rotation thereof to the at least one rotatable element.

23. The saw assembly of claim 9, wherein the at least one rotatable element comprises a complementary pair of flanges and further comprising a saw blade configured to be secured between the complementary pair of flanges.

24. The saw assembly of claim 9, further comprising a rotational balance monitoring element for monitoring a rotational balance of at least the at least one rotatable element during rotation of the spindle.

25. The saw assembly of claim 9, wherein the at least one rotatable element comprises at least one balance adjustment element for aligning a center of mass of the at least one rotatable element with the axis of rotation of the spindle.

26. The saw assembly of claim 9, wherein the at least one rotatable element comprises a rotatable element for use in dicing semiconductor substrates or carrier substrates.

27. A method for modifying clearance between components in a saw assembly, comprising:
  providing a spindle having:
    an axis of rotation extending along a length thereof; and
    an outer surface;
  installing at least one rotatable element on the spindle, the at least one rotatable element having:
    an aperture for receiving the spindle and including an inner surface; and
    a center of mass;
  positioning at least one centering element in a clearance between the inner surface of the at least one rotatable element and the outer surface of the spindle, positioning including positioning the center of mass of the at least one rotatable element at a radial distance from the axis of rotation of the spindle that is less than the clearance.

28. The method of claim 27, wherein positioning includes positioning the center of mass in substantial alignment with the axis of rotation.

29. The method of claim 27, wherein positioning the at least one centering element includes positioning at least one O-ring in the clearance.

30. The method of claim 27, wherein positioning the at least one centering element includes positioning at least one spring in the clearance.

31. The method of claim 30, wherein positioning the at least one spring comprises positioning at least one coiled spring.

32. The method of claim 27, wherein positioning the at least one centering element comprises positioning a plurality of centering elements in the clearance.

33. The method of claim 32, wherein positioning the plurality of centering elements comprises positioning each centering element of the plurality of centering elements at a different axial position than at least one other centering element of the plurality of centering elements.

34. The method of claim 32, wherein positioning the plurality of centering elements comprises positioning each centering element of the plurality of centering elements at a different radial position than at least one other centering element of the plurality of centering elements.

35. The method of claim 27, wherein positioning the at least one centering element comprises positioning the at least one centering element partially within a recess formed in at least one of the inner surface of the rotatable element and the outer surface of the spindle.

36. The method of claim 27, further comprising:
  measuring the clearance prior to at least the positioning the at least one centering element.

37. The method of claim 36, further comprising:
  selecting the at least one centering element based at least in part on the clearance.

38. The method of claim 27, further comprising:
  measuring a rotational balance of the at least one rotatable element during rotation of the spindle.

39. The method of claim 38, further comprising:
  repositioning the center of mass of the at least one rotatable element based on measuring the rotational balance.

40. The method of claim 27, further comprising:
  installing at least another rotatable element on the spindle, the at least another rotatable element having:
    an aperture for receiving the spindle and including an inner surface; and
    a center of mass; and
  positioning at least another centering element in a clearance between the inner surface of the aperture of the at least another rotatable element and the outer surface of the spindle.

41. The method of claim 40, wherein installing the at least another rotatable element comprises installing the at least another rotatable element adjacent to the at least one rotatable element.

42. The method of claim 41, wherein installing the at least one rotatable element and installing the at least another rotatable element comprise installing a complementary pair of blade-securing flanges.

43. The method of claim 42, further comprising:
  installing a dicing blade on the spindle, between the complementary pair of blade-securing flanges.

44. The method of claim 43, further comprising:
  centering the dicing blade between the complementary pair of blade-securing flanges.

45. The method of claim 40, wherein positioning the at least another centering element comprises positioning at least another centering element in both the clearances.

46. The method of claim 40, wherein positioning the at least another centering element comprises positioning separate centering elements in each of the clearances.

* * * * *

UNITED STATES PATENT AND TRADEMARK OFFICE
CERTIFICATE OF CORRECTION

| | | |
|---|---|---|
| PATENT NO. | : 6,929,000 B2 | Page 1 of 2 |
| APPLICATION NO. | : 10/191711 | |
| DATED | : August 16, 2005 | |
| INVENTOR(S) | : Ernest J. Hamilton | |

It is certified that error appears in the above-identified patent and that said Letters Patent is hereby corrected as shown below:

In The Drawings:
Replace FIG. 5B with the following:

Fig. 5B

UNITED STATES PATENT AND TRADEMARK OFFICE
CERTIFICATE OF CORRECTION

PATENT NO. : 6,929,000 B2
APPLICATION NO. : 10/191711
DATED : August 16, 2005
INVENTOR(S) : Ernest J. Hamilton It is certified that error appears in the above-identified patent and that said Letters Patent is hereby corrected as shown below:

| | | |
|---|---|---|
| COLUMN 9, | LINE 61, | change "surface 16" to --outer surface 16-- |
| COLUMN 10, | LINE 5, | change "recess 24" to --circumferential groove 24-- |
| COLUMN 10, | LINE 7, | change "biasing elements 30, 30'''" to --biasing elements 30-- |
| COLUMN 10, | LINE 33, | change "axial end thereof." to -- axial end 137' thereof.-- |

Signed and Sealed this

Twenty-fourth Day of October, 2006

JON W. DUDAS
*Director of the United States Patent and Trademark Office*